United States Patent
Mahn, Jr.

[11] Patent Number: 5,364,688
[45] Date of Patent: Nov. 15, 1994

[54] HEAT ACTIVATED TRANSFER FOR ELASTOMERIC MATERIALS

[76] Inventor: John Mahn, Jr., 6154 Oakhaven Dr., Cincinnati, Ohio 45238

[21] Appl. No.: 123,570

[22] Filed: Sep. 20, 1993

Related U.S. Application Data

[63] Continuation-in-part of Ser. No. 27,954, Mar. 8, 1993.

[51] Int. Cl.⁵ .................. B44C 1/16; B60C 13/00; B32B 25/00; B32B 27/00
[52] U.S. Cl. .................. 428/187; 428/423.7; 428/493; 428/913.3; 428/914; 152/524; 8/467; 156/235; 156/239; 156/240
[58] Field of Search .................. 8/467; 156/230, 235, 156/239, 240; 428/913, 914, 187, 492, 493, 200, 913.3; 152/523, 524; 928/423.7

[56] References Cited

U.S. PATENT DOCUMENTS

| | | |
|---|---|---|
| 1,875,582 | 9/1932 | Foley .................. 40/298 X |
| 2,833,685 | 4/1956 | Lawrence .................. 428/187 X |
| 2,912,344 | 11/1959 | Newman .................. 428/354 X |
| 2,920,674 | 1/1960 | Bull .................. 152/361 X |
| 2,984,596 | 5/1961 | Franer .................. 40/298 X |
| 3,225,810 | 12/1965 | Enabnit .................. 152/330 X |
| 3,296,061 | 1/1967 | Tavenor .................. 428/493 X |
| 3,729,041 | 4/1973 | Kubota .................. 152/353 |
| 3,952,131 | 4/1976 | Sioeman .................. 428/334 X |
| 4,021,591 | 5/1977 | DeVries .................. 428/914 X |
| 4,059,471 | 11/1977 | Haigh .................. 428/914 X |
| 4,098,935 | 7/1978 | Knudsen .................. 428/40 X |
| 4,202,663 | 5/1980 | Haigh .................. 8/471 X |
| 4,224,268 | 9/1980 | Merci .................. 264/139 X |
| 4,238,190 | 12/1980 | Rejto .................. 8/471 X |
| 4,269,885 | 5/1981 | Mahn .................. 428/216 X |
| 4,311,181 | 1/1982 | Hausch .................. 428/187 X |
| 4,354,851 | 10/1982 | Hix .................. 8/471 X |
| 4,395,263 | 7/1983 | Davis .................. 8/471 X |
| 4,461,795 | 7/1984 | Ogawa .................. 428/187 X |
| 4,541,340 | 9/1985 | Peart .................. 101/470 X |
| 4,577,204 | 3/1986 | Shibata .................. 428/913 X |
| 4,581,266 | 4/1986 | Magnotta .................. 428/187 X |
| 4,610,904 | 9/1986 | Mahn, Sr. et al. .................. 428/79 X |
| 4,692,198 | 9/1987 | Borreson .................. 156/235 X |
| 4,711,874 | 12/1987 | Yuyama .................. 428/914 X |
| 4,820,310 | 4/1989 | Fukui .................. 8/456 X |
| 4,865,913 | 9/1989 | Takeuchi .................. 428/913 X |
| 4,927,709 | 5/1990 | Parker .................. 428/914 X |
| 5,160,383 | 11/1992 | Gartland .................. 156/510 X |
| 5,164,224 | 11/1992 | Kojima et al. .................. 427/65 X |
| 5,171,633 | 12/1992 | Muramoto et al. .................. 428/374 X |
| 5,173,684 | 12/1992 | Ijiri et al. .................. 340/605 X |
| 5,179,611 | 1/1993 | Umeda et al. .................. 385/110 X |
| 5,183,695 | 2/1993 | Masuhra et al. .................. 428/151 X |
| 5,183,856 | 2/1993 | Kitagawa et al. .................. 525/282 X |
| 5,185,420 | 2/1993 | Smith et al. .................. 528/61 X |
| 5,187,224 | 2/1993 | Hamanaka et al. .................. 524/505 X |

FOREIGN PATENT DOCUMENTS

| | | | |
|---|---|---|---|
| 0097528 | 4/1984 | European Pat. Off. .................. 428/914 |
| 0116908 | 10/1978 | Japan .................. 428/187 |
| 0119990 | 10/1978 | Japan .................. 428/187 |
| 0115211 | 9/1981 | Japan .................. 428/187 |

*Primary Examiner*—David A. Simmons
*Assistant Examiner*—Charles Rainwater

[57] ABSTRACT

A heat activated transfer which is particularly suitable for marking elastomeric articles comprises a lower elastomeric layer bonded to an upper polyester layer. The upper polyester layer in turn carries indicia which is a sublimation dye heat transferred into the polyester layer. The polyester is preferably a high temperature saturated polyester resin, preferably polyethylene terephthalate. The lower layer is preferably a thermoplastic elastomeric layer. The two layers are bonded together by a thermoplastic adhesive, preferably a polyester.

8 Claims, 1 Drawing Sheet

HEAT ACTIVATED TRANSFER FOR ELASTOMERIC MATERIALS

RELATED APPLICATIONS

This is a continuation-in-part application of U.S. patent application Ser. No. 08/027,954, entitled "Heat Activated Transfer For Elastomeric Materials," filed Mar. 8, 1993.

BACKGROUND OF THE INVENTION

Elastomers are a group of materials, which at room temperature can be stretched repeatedly and return to their original length. They are formed into many different items such as tires, mats, fan belts, hoses, gloves, gaskets, and the like. Frequently there is a need to apply indicia onto the surface of these items. The indicia can be in the form of an advertisement or it can have a more practical purpose such as providing a machine readable bar code onto the surface of the article for inventory control.

There are inks, dyes, and paints which can be applied to the surface of cured elastomeric articles. These, however, are difficult or expensive to apply and can be easily abraded, making the indicia unreadable. Indicia in the form of contrasting elastomeric material can be cured into the surface of the elastomeric article. This, for example, is how the whitewall of a tire is formed. But, this method has limited utility.

Heat activated transfers are used to provide indicia for various articles. But, these transfers generally cannot withstand curing conditions and/or abuse in use. If applied to an elastomeric article, the bond may not withstand abrasive forces and the indicia itself can be marred even if the transfer remains bonded to the substrate.

SUMMARY OF THE INVENTION

It is an object of the present invention to provide an indicia bearing transfer which can be applied to elastomeric articles. Further, it is an object of the present invention to provide such a transfer which may be used for both cured and uncured elastomeric articles.

Further, it is an object of the present invention to provide such a transfer which can be produced in a manner which facilitates creation of individual indicia for each article marked.

For example, it is an object of the present invention to enable one to mark individual articles with individual bar codes or similar identifying numbers which can be printed and applied to the article by the actual user as opposed to preprinting the same indicia on thousands or tens of thousands transfers.

The objects and advantages of the present invention will be further appreciated in light of the following detailed description and drawings in which:

DETAILED DESCRIPTION

Figure 1:
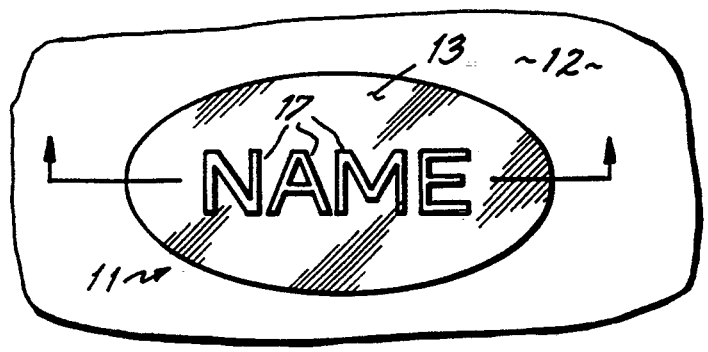
FIG. 1 is a top view of the present invention.

According to the present invention, a transfer 11 suitable for use in marking an elastomeric substrate or article 12 includes an upper clear layer 13 coated with a primer 14 and subsequently a thermoplastic adhesive 15 which in turns bonds the upper clear layer to an elastomeric layer 16. This heat transfer 11 is marked with indicia 17 which is a sublimation dye heat transfer into the upper clear layer 13.

For use in the present invention, the elastomeric layer 16 can either be an uncured elastomeric material which includes suitable curing agents or alternately it will be a thermoplastic elastomeric material. Suitable elastomeric materials can include nitrile rubber, chlorinated polyethylene, neoprene, chlorosulfonyl polyethylene, ethylene ether polysulfides, ethylene polysulfides, ethylene propylene copolymers, ethylene propylene terpolymers, fluorinated hydrocarbon elastomer, chlorosilicone, isobutylene, isoprene, acrylic rubbers, polybutadienes, polyepichlorohydrines, natural rubber, synthetic isoprene urethane rubbers, as well as styrene butadiene copolymer elastomer.

An elastomeric layer which is precured is used only in situations where the transfer was being applied to an uncured elastomeric article and the entire article subsequently cured. A thermoplastic elastomeric material is used when the transfer is to be bonded to the surface of a cured or uncured elastomeric article. Thermoplastic elastomers are very well known. Particular thermoplastic elastomers include styrenic thermoplastic elastomer, polyolefin thermoplastic elastomer, thermoplastic polyurethane elastomer, polyester thermoplastic elastomer, polyamide thermoplastic elastomer, thermoplastic polybutadiene ethylene-vinyl acetate copolymer thermoplastic, natural rubber, thermoplastic PVC/nitrile rubber, fluorocarbon elastomer, chlorinated polyethylene elastomer, and thermoplastic styrene-butadiene rubber. One preferred thermoplastic elastomer is Chemigum manufactured by Goodyear Chemical.

Generally the thermoplastic elastomer should have a melting temperature of 250° F. to 400° F. and preferably 300°.

The thickness of the elastomeric layer can vary from several mils thick, i.e., 10–20 mils down to 2–3 mils. This generally is a matter of choice and 5 mils has been found to be acceptable.

A layer of thermoplastic adhesive bonds the upper clear polyester layer to the thermoplastic elastomer. This adhesive must be compatible with both the polyester layer and the elastomer. Preferably the adhesive is a polyester thermoplastic adhesive since it is most compatible with the polyester upper layer. Bostik polyester thermoplastic adhesive is preferred. A suitable polyamide adhesive is EMS 1G. A suitable polyurethane adhesive is Morton PS27.

The thermoplastic adhesive layer, of course, must be one which will not break down at application temperature. This may vary from 300° F. up to about 400° F. Generally, the applied thickness of the adhesive will be from about 1–3 mils with about 2 mils being preferred.

The upper polyester layer is coated on its lower surface with a primer. Generally a polyester based primer is preferred. One such primer is Bostik Brand 7650 adhesive primer for polyester which is a linear saturated polyester dissolved in methylethyl ketone and toluol and includes an isocyanate cross-linking agent. Generally about less than 1 mil of the primer is applied to the bottom surface of the upper thermoplastic polyester layer.

The upper thermoplastic polyester layer in turn is a clear polyester layer. This must be a high melting point polyester layer, i.e., one which does not melt at temperatures below 400° F. Suitable polyester layers include high molecular weight thermoplastic saturated polyester resins. The most common of such resins is polyethylene terephthalate sold under the brand name Mylar. Other polyester resins which would be suited would be saturated polyester resins having a melting point greater than 400° F. The thickness of the upper polyester layer should be from about 0.25 up to 5.0 mils with 0.5 to 1.0 mil preferred.

The indicia layer is a sublimation dye which is heat transferred into the surface of the upper polyester layer. This sublimation or diffusion dye layer can be formed from a variety of well known sublimation dyes which are suitable for application to the thermoplastic polyester layer. They are generally used to apply indicia to woven material.

Generally the dyes listed in the Color Index under the heading dispersed dyes are suitable. These include, for example, azo, anthraquinone, nitro, azomethine, and styryl-type dyes. These are disclosed, for example;, in U.S. Pat. Nos. 4,576,610, 3,508,492, 4,202,663, 4,021,591, 4,654,044, 2,911,280, and 3,502,495. One commercially available sublimation dye is sold by Xpres Company of Winston-Salem, N.C. This is particularly good for offset printing applications. Others sold by Fugi KK and Eastman Kodak, referred to as thermotransfer diffusion donor materials, are also suitable. A dye which is suitable for application with a lithographic press is sold by Roach, Inc. Dyes which can be applied with a dot matrix printer are also sold by Pearl Worldwide.

The indicia is reverse printed or transferred onto a transfer sheet (not shown) which will withstand the temperature of the diffusion or release of the dye, i.e., the sublimation temperature. Suitable methods for printing the dye onto the transfer sheet include thermotransfer, offset printing, lithographic printing, and dot matrix printing. Suitable heat transfer printers are sold by Seico, Zebra (140), and Fargo Protegee Plus. The transfer sheet is typically paper coated with a release coating such as wax, high molecular weight polyethylene glycols, low molecular weight polyethylene, polytetrafluoroethylene, silicone, or stearic acid. Uncoated bond paper works well.

The heat activated transfer of the present invention is formed in a multi-step process. In the first step, the sublimation dye is printed onto a transfer sheet as previously described. In the second step, the remaining portions of the transfer are laminated together. In this process, the upper clear polyester layer is coated with the solvent primer. This is allowed to dry and the adhesive layer is applied onto the primer layer. The polyester layer bonded to the adhesive layer is then heat laminated to the elastomeric layer.

The indicia can either be applied prior to application or during application. If applied prior to application, the sublimation dye is heat transferred into the upper polyester layer at the same time the elastomeric layer is laminated to the polyester layer.

Where the ultimate consumer will individually mark the articles with individually printed indicia such as bar codes and other numerical indicia, it is more practical to apply the indicia after the polyester layer is laminated to the elastomeric layer. Where the elastomeric layer is a thermoplastic elastomeric layer which is being bonded to a cured elastomeric article, the indicia is applied by placing the elastomer layer in contact with the elastomeric article. The indicia, reverse printed onto a release layer, is placed into contact with the upper polyester layer. Heat and pressure are applied effective to cause the thermoplastic elastomer layer to melt and bond to the elastomeric article. This same heat and pressure will cause the dye to diffuse into the polyester layer, permanently marking the polyester layer.

If a transfer is applied to an uncured elastomeric article during the curing process, the transfer would be placed on the uncured elastomeric article with the elastomeric layer 16 in contact with the uncured elastomeric article 12. The indicia 17, reverse printed on a transfer sheet, is placed against the polyester layer 13. All of this is subjected to heat and pressure effective to cause the article to cure. If elastomer layer 16 is a thermoset elastomer, this will cause layer 16 to cure. If layer 16 is a thermoplastic elastomer, the thermoplastic elastomer will melt, but not flow due to the fact that is held within a confined area under pressure during this cure cycle. Upon cooling, the thermoplastic layer would then solidify and be bonded to the elastomeric article. This will also cause the indicia 17 to migrate into the polyester layer 13 permanently marking it (as shown in the figures).

Figure 2:
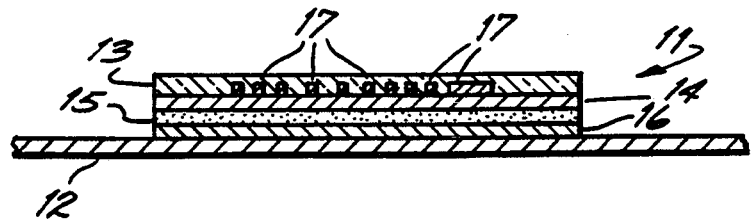
FIG. 2 is a cross-sectional view taken at lines 2—2 of FIG. 1.
Figure 3:
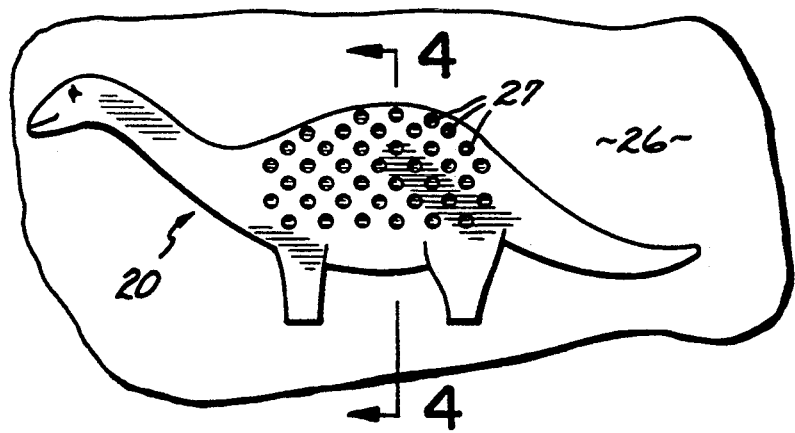
FIG. 3 is a top view of an alternate embodiment of the present invention.
Figure 4:
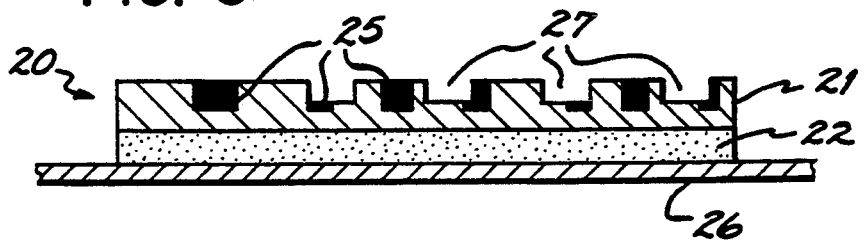
FIG. 4 is a cross-sectioned view taken at lines 4—4 of FIG. 3.

An alternate embodiment 20 is shown in FIGS. 3 and 4. In this embodiment, the upper layer 21 is a thermoplastic elastomeric layer having a film thickness of 2 to about 20 mils preferably about 5 mils. This is bonded to a lower thermoplastic layer 22 preferably a polyester adhesive layer. Both the film thicknesses and chemical compositions of these layers are the same as the embodiment shown in FIGS. 1 and 2. In this embodiment, however, the thermoplastic elastomeric layer 21 is either clear or colored and is preferably colored and is marked in turn with indicia 25 which is a sublimation dye heat transferred into the surface of the elastomeric layer. The alternate embodiment 20 can be cut out in the form of a number and applied with or without embossment. Such number can be applied as one color or with two or more colors using sublimation dyes.

The transfer itself 20 is heat bonded to a cloth substrate 26 as previously described. However, in this embodiment, the heating iron preferably has an embossed surface which provides surface configuration to the transfer. The transfer shown in FIG. 3 has a plurality of debossed areas 27 throughout its surface. However, any surface configuration can be employed depending on structure of the heating iron. This provides a heat activated transfer which is bondable to cloth as opposed to an elastomeric substrate although it could be bonded to an elastomeric substrate. No upper polyester layer or clear layer is required since this particular transfer is designed for application to clothing and is therefore not subjected to as severe washing conditions nor to an extreme heat cycle.

The indicia 25 can be heat transferred to the upper elastomeric layer 21 either prior to bonding to the thermoplastic adhesive layer 22 subsequent to bonding to the thermoplastic adhesive layer and prior to being bonded to the cloth substrate 26 or can be applied at the same time the transfer 20 is heat bonded to the elastomeric substrate. Likewise, the debossment or application of surface configuration can be made at any of these times. This provides a very unique heat activated transfer which has significant dimensional configuration not normally present in heat activated transfers. The use of the thermoplastic elastomer provides an extreme flexibility in producing these. Due to the potential thickness of the elastomeric layer, the surface configuration can be fairly dramatic. Further, marking the thermoplastic elastomer with the sublimation dye provides an exceptionally durable and aesthetically appealing transfer.

As can be seen from the previous description, the present invention provides a wide variety of potential applications. The present invention can be used to provide premarked transfers which can be bonded to cured or uncured elastomeric articles. The present invention also permits the end user to individually mark the transfer, if desired, and apply these to cured or uncured elastomeric articles. Because a sublimation dye provides the indicia, the printers required to form the indicia are relatively inexpensive and, in fact, dot matrix printers are acceptable for this application. In light of this, the invention itself, although described in its preferred embodiment, should only be defined by the appended claims wherein.

I claim:

1. An indicia bearing elastomeric article comprising: an elastomeric layer having a lower surface bonded to said elastomeric article, said elastomeric layer having an upper surface bonded to a clear high melting point polyester thermoplastic layer, indicia comprising a sublimation dye carried in said polyester thermoplastic layer.

2. The article claimed in claim 1 further comprising a thermoplastic adhesive layer bonding said upper polyester layer to said elastomeric layer.

3. The article claimed in claim 2 wherein said elastomeric layer is a thermoplastic elastomer.

4. The article claimed in claim 2 wherein said elastomeric layer is an uncured elastomeric layer.

5. The article claimed in claim 2 wherein said elastomeric layer is a cured elastomeric layer.

6. The article claimed in claim 5 wherein said thermoplastic adhesive is a polyester adhesive.

7. The article claimed in claim 6 wherein said upper polyester layer comprises polyethylene glycol terephthalate.

8. A heat activated indicia bearing sheet comprising:
a thermoplastic elastomeric lower layer bonded to a primer coated clear polyethylene terephthalate upper layer by a polyester adhesive layer;
said transfer further including indicia comprising sublimation dye carried in said clear polyethylene terephthalate upper layer.

* * * * *